US011847504B2

(12) United States Patent
Tseng et al.

(10) Patent No.: US 11,847,504 B2
(45) Date of Patent: Dec. 19, 2023

(54) METHOD FOR CPU TO EXECUTE ARTIFICIAL INTELLIGENCE RELATED PROCESSES

(71) Applicant: NEXCOM International Co., Ltd., New Taipei (TW)

(72) Inventors: Chien-Wei Tseng, New Taipei (TW); Chin-Ling Chiang, New Taipei (TW); Po-Hsu Chen, New Taipei (TW)

(73) Assignee: NEXCOM INTERNATIONAL CO., LTD., New Taipei (TW)

( * ) Notice: Subject to any disclaimer, the term of this patent is extended or adjusted under 35 U.S.C. 154(b) by 576 days.

(21) Appl. No.: 17/124,467

(22) Filed: Dec. 16, 2020

(65) Prior Publication Data

US 2022/0188150 A1 Jun. 16, 2022

(51) Int. Cl.
*G06F 9/50* (2006.01)
*G06F 9/48* (2006.01)
*G06F 9/38* (2018.01)
*G06F 17/16* (2006.01)
*G06N 20/00* (2019.01)

(52) U.S. Cl.
CPC .......... *G06F 9/5083* (2013.01); *G06F 9/3836* (2013.01); *G06F 9/4881* (2013.01); *G06F 9/505* (2013.01); *G06F 9/5044* (2013.01); *G06F 17/16* (2013.01); *G06N 20/00* (2019.01)

(58) Field of Classification Search
None
See application file for complete search history.

(56) References Cited

U.S. PATENT DOCUMENTS 11,500,962 B1 * 11/2022 Meyer .................... G06N 3/063

FOREIGN PATENT DOCUMENTS

| CN | 107871160 A | 4/2018 |
| CN | 110135575 A | 8/2019 |
| WO | 2019013711 A1 | 1/2019 |

OTHER PUBLICATIONS

Sun et al., "Computation on Sparse Neural Networks: an Inspiration for Future Hardware", Apr. 24, 2020, Alibaba DAMO Academy. (Year: 2020).*
Office Action dated May 9, 2022 of the corresponding Taiwan patent application No. 109134194.

* cited by examiner

*Primary Examiner* — Qing Yuan Wu
(74) *Attorney, Agent, or Firm* — Chun-Ming Shih; HDLS IPR SERVICES

(57) ABSTRACT

A method for a CPU to execute artificial intelligence related processes is disclosed. The method includes: when executing TensorFlow on an electronic device, calling a corresponding AI model of TensorFlow according to content of program codes; determining and obtaining one or multiple sparse matrixes used by the AI model in performing calculations; executing a matrix simplifying procedure to the one or multiple sparse matrixes; executing an instruction transforming procedure to an instruction set applied for the AI model; issuing an instruction to a weighted CPU of the electronic device by the AI model according to transformed instruction set; and the weighted CPU, after receiving the instruction, averagely distributing multiple procedures indicated by the AI model to each of multiple threads of the weighted CPU to be respectively executed according to a weighting value of each of the multiple procedures.

6 Claims, 4 Drawing Sheets

FIG.3

METHOD FOR CPU TO EXECUTE ARTIFICIAL INTELLIGENCE RELATED PROCESSES

BACKGROUND OF THE INVENTION

1. Technical Field

The technical field relates to a central processing unit, and specifically relates to an executing method for the central processing unit to execute processes related to artificial intelligence.

2. Description of Related Art

Recent year, artificial intelligence (AI) is developed flourishingly, a lot of enterprises are earnest in developing technologies and products related to AI.

Generally speaking, software engineers usually develop processes related to AI by using TensorFlow which is created and published by Google. In particular, TensorFlow is an open-source software library for machine learning, and TensorFlow provides a lot of AI related models that may help the software engineers in AI development.

The AI related models usually use a lot of matrixes for computations, but current technologies do not provide any approach to optimize the matrixes used by the AI related models. As a result, these AI related models have to process a lot of computation parameters while executing such computations. In view of the above problem, current AI related computations are usually executed by high-end hardware, such as high-end central processing units (CPUs), or high-end hosts incorporated with specific graphic processing units (GPUs). However, the above-mentioned hardware may increase the cost in AI development and practical use of AI, and also cause cooling problem in such hardware.

Regarding to the strong computing ability of current CPUs and GPUs, a CPU is now unnecessarily to optimize its execution order of executing each procedure. In particular, the CPU may only execute received instructions according to a received order. Frequently, the CPU cannot complete the computation of one single procedure by one thread, and the CPU needs to hand over the rest of the procedure to next thread for continually computing this procedure. When the above phenomenon occurs, the CPU needs additional time for executing SWAP and thus reduces its executing speed. In the end, user needs to adopt higher-end CPU, or needs to arrange an additional GPU to the host. In such circumstance, low-end hardware, such as X86 architecture based industrial personal computers (IPCs), is blocked from being used to develop and practice AI related applications.

SUMMARY OF THE INVENTION

The disclosure is directed to a method for a CPU to execute artificial intelligence (AI) related processes, which may simplify the matrixes used by AI models during computations and optimize the execution time of the CPU, so as to allow low-end hardware to be used in AI development and practical use of AI.

In one of the exemplary embodiments, the method in this invention includes following steps: executing TensorFlow on an electronic device, and calling one or multiple AI models of TensorFlow according to content of program codes; determining and obtaining one or multiple sparse matrixes used by the AI model in performing a computation; executing a matrix simplifying procedure to the sparse matrixes; executing an instruction transforming procedure to an instruction set applied for the AI model; issuing an instruction to a weighted CPU according to transformed instruction set by the AI models; and, after the weighted CPU receives the instruction, the weighted CPU averagely distributing multiple procedures indicated by the AI model to multiple threads of the weighted CPU according to a weighting value of each of the procedures.

In comparison with related art, the technical solution provided by this disclosure uses a matrix simplifying procedure to compress one or multiple sparse matrixes used by an artificial intelligence (AI) model in computations, so as to reduce an amount of computation parameters that the AI model needs to process in such computations. This disclosure sets the weighting values for multiple procedures indicated by the AI model through applying transformed instructions, and issues an instruction to a weighted CPU, therefore the weighted CPU averagely distributes the multiple procedures to multiple threads for optimizing the execution time of the weighted CPU. In a conclusion, the low-end hardware may be used to develop and practice AI with the technical solution provided by this disclosure.

DESCRIPTION OF THE DRAWINGS

FIG. 3 is a schematic diagram showing a matrix simplification of a first embodiment according to this invention.

DETAILED DESCRIPTION OF THE INVENTION

In cooperation with the attached drawings, the technical contents and detailed description of this invention are described thereinafter according to multiple embodiments, being not used to limit its exectuing scope. Any equivalent variation and modification made according to appended claims is all covered by the claims claimed by this invention.

This invention discloses a method for a central processing unit (CPU) to execute artificial intelligence (AI) related processes (referred to as the executing method hereinafter), the executing method may be applied for an electronic device using a weighted CPU. In particular, the electronic device in this disclosure means the electronic device that uses low-end CPU as essential element and optionally uses a graphics processing unit (GPU) as a nonessential element. For example, the electronic device may be a personal computer (PC), an industrial PC (IPC), an industrial server, etc., but not limited thereto. By incorporating with the executing method discussed in this disclosure, a relative low-end hardware can be used to develop and practice AI.

Figure 1:
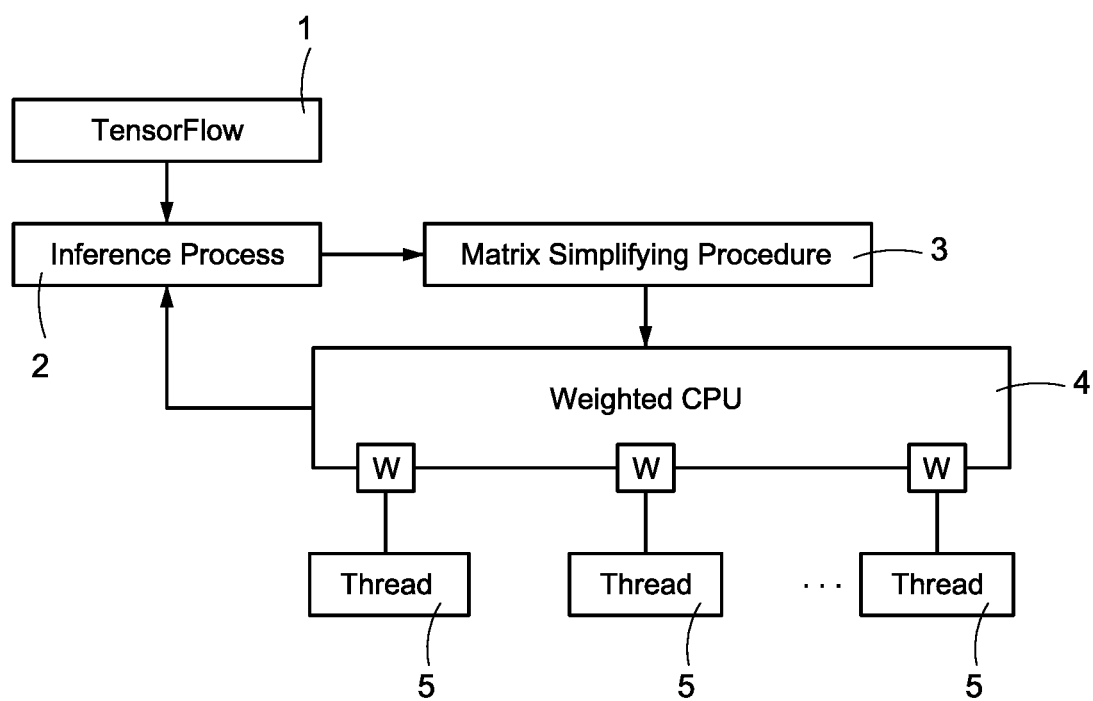
FIG. 1 is a schematic diagram of a system of a first embodiment according to this invention.

Please refer to FIG. 1, FIG. 1 is a schematic diagram of a system of a first embodiment according to this invention. As mentioned above, the executing method in this disclosure is used to assist the user in AI development and practical use of AI, which consume huge computation resources, through the low-end hardware. TensorFlow, which is created and published by Google, is used to execute AI related computations while developing and practicing AI.

TensorFlow 1 is an open-source software library for machine learning, and TensorFlow provides a lot of models being used in developing AI related processes (referred to as AI models hereinafter). While writing program codes, a software engineer (i.e., a user) may use one or multiple AI models provided by TensorFlow 1 directly (i.e., calling the AI models through TensorFlow 1 in the program codes), so as to directly and quickly perform analysis and computation to the data, and implements AI related processes such as machine learning, inference, etc.

As disclosed in FIG. 1, when a user writes program codes on an electronic device, the electronic device may be operated to execute TensorFlow 1 and call one or multiple AI models of TensorFlow 1, and the electronic device may implement an inference process 2 of AI through the AI models. In one of the exemplary embodiments, the user may use a command such as "import TensorFlow" in the program codes for the electronic device to execute TensorFlow 1, so the electronic device may call the one or multiple AI models of TensorFlow 1. In another embodiment, the one or multiple AI models may include models for image processing related data, such as an imageNet model, an inception model, etc., but not limited thereto.

Most of the current AI models, such as the imageNet model and the inception model mentioned above, may perform data computations through a lot of matrixes, and these AI models may issue instructions to the CPU through using instruction set for the CPU to run multiple procedures related to the data computations. The specification of CPU is upgrading constantly, and a part of the high-end hardware is further arranged with a GPU for processing image related data. As a result, when performing AI related computations through the hight-end hardwares, the software engineer may not need to optimize the AI models, and may not have to optimally distribute and schedule the procedures executed by the high-end CPUs. Hence, the AI related computations are difficult to implement to the low-end hardware, such as an IPC using a low-end CPU without a GPU.

One of the technical features of this disclosure is that, when an application program executes TensorFlow 1 and calls one of the aforementioned AI models to perform computations in order to implement an inference process 2, a matrix simplifying procedure 3 is executed to the matrixes used by the AI model during the computations. Therefore, an amount of computation parameters that the AI model needs to process in such computations may be reduced.

In addition to reducing the amount of the computation parameters processed in the computations, this disclosure further looks up an instruction set applied for the AI model in advance, and executes an instruction transforming procedure to the instructions included in the instruction set. After a weighted CPU 4 of this disclosure receives an instruction issued from the AI model, the weighted CPU 4 may schedule multiple procedures included in the computations according to a weighting value of each of the procedures, and averagely distribute these procedures to each of a plurality of threads 5 of the weighted CPU 4 for each thread 5 to respectively execute the distributed procedure. Therefore, the aforementioned inference process 2 of the application program may be implemented by these threads 5 of the weighted CPU 4. By using such technical solution, the required processes of AI with respect to the average resource using rate of a CPU may be well reflected, and the execution time of the CPU may be optimized.

The executing method in this disclosure combines the matrix simplifying procedure 3 and a thread distribution technology of the weighted CPU 4, which may greatly reduce the resources needed for performing AI related computations. As a result, the low-end hardware, such as X86 IPCs, may be used to execute AI related tasks, such as training and identification. Therefore, the user may save the cost of AI development and practical use of AI, as well as increase the computation speed of the electronic device in implementing the inference process 2.

Figure 2:
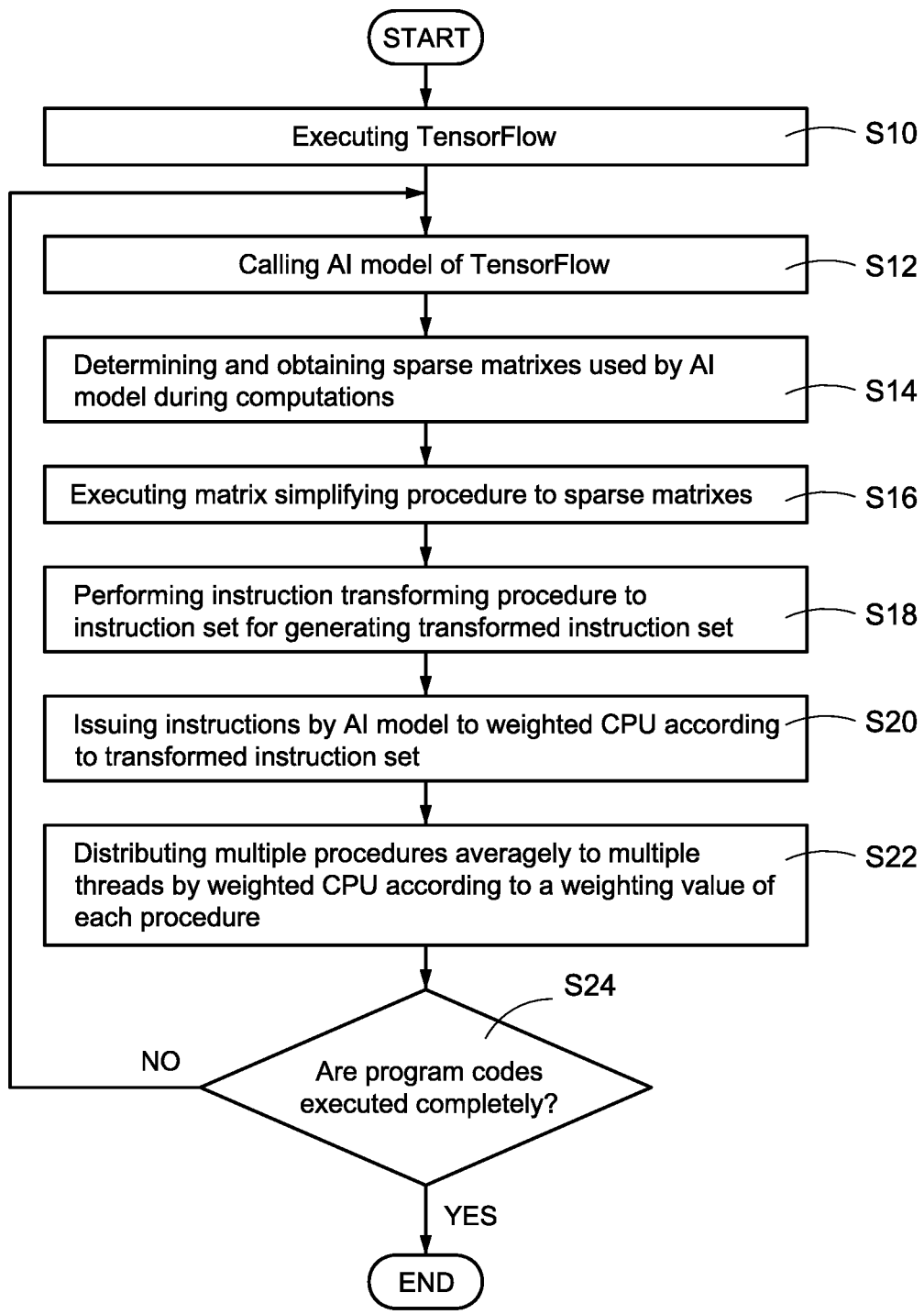
FIG. 2 is a flowchart of an executing method of a first embodiment according to this invention.

FIG. 2 is a flowchart of an executing method of a first embodiment according to this invention. The executing method in this disclosure is applied for an electronic device using the weighted CPU 4. In one of the exemplary embodiments, the executing method is applied for a low-end electronic device, such as an X86 IPC, and the electronic device uses an Intel architecture based weighted CPU 4, but not limited thereto.

As shown in FIG. 2, when executing program codes, the electronic device executes TensorFlow 1 according to content of the program codes (step S10), and calls at least one AI model of TensorFlow 1 according to content of the program codes (step S12). In one embodiment, the program codes execute TensorFlow 1 through a command, such as "import TensorFlow", and call at least one AI model of performing image processing, such as an imageNet model, an inception model, etc., but not limited thereto.

The detailed descriptions of the imageNet model and the inception model are omitted here for brevity.

The executing method in the disclosure is existing between TensorFlow 1 and the weighted CPU 4 in a form of a driver or a middleware, and the executing method is applied for reducing the amount of the computation parameters that the AI model needs to process during the computations. Besides, the executing method is applied for the weighted CPU 4 to execute such computations averagely through multiple threads 5 of the weighted CPU 4, so as to optimize the execution time of the weighted CPU 4.

As disclosed in FIG. 2, the executing method in the disclosure further determines and obtains one or multiple sparse matrixes used by the AI model during the computations (step S14), and executes the matrix simplifying procedure 3 to the one or multiple sparse matrixes (step S16), so as to reduce the amount of the computation parameters that the AI model needs to process in the computations.

Figure 3:
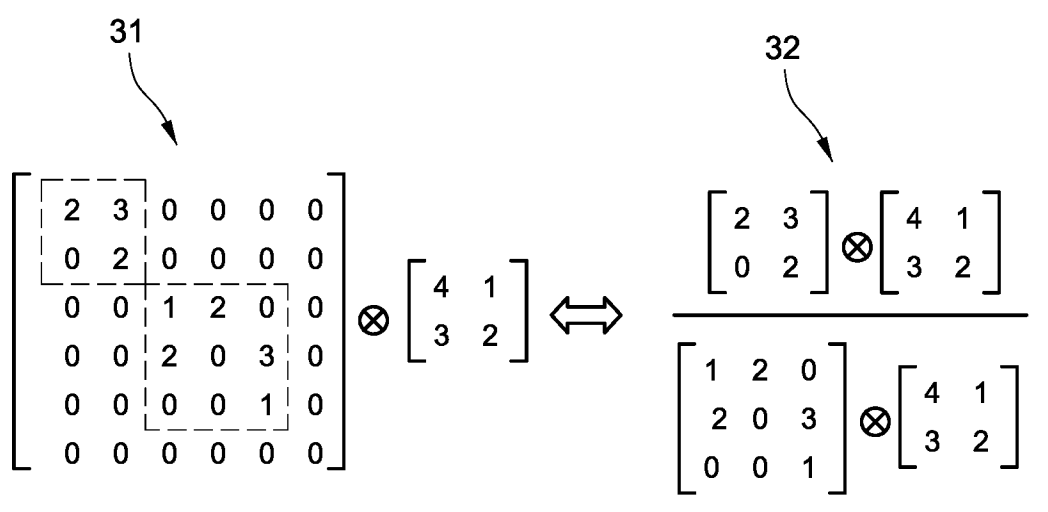

Please refer to FIG. 3, FIG. 3 is a schematic diagram showing a matrix simplification of a first embodiment according to this invention. As shown in FIG. 3, a sparse matrix 31 indicates a matrix that most of the elements in the matrix are zero. The huge sparse matrixes 31 are frequently used for solving linear models, so the sparse matrixes 31 are usually used by AI related models during the computations.

In order to reduce the amount of the computation parameters, the matrix simplifying procedure 3 only save non-zero elements of the obtained sparse matrix 31, so as to compress the sparse matrix 31. Also, the matrix simplifying procedure 3 decomposes the compressed sparse matrix 31 into one or multiple consolidate matrixes 32 for completing a matrix simplification action. In this disclosure, when the AI model is called for computations, the AI model performs the computations through the consolidate matrixes 32 from the matrix simplifying procedure 3 as shown in FIG. 3.

The detailed description of the above-mentioned compression of the sparse matrix 31 and generation of the consolidate matrix 32 are omitted here for brevity. Besides, the approach of decomposing the sparse matrix 31 into the one or multiple consolidate matrixes 32 is one of the exemplary embodiments of the matrix simplifying procedure 3 in this invention, similar approaches used for simplifying the matrixes may also be encompassed by this invention, detailed description is omitted here for brevity.

Please refer back to FIG. 2. After the step S16, the executing method is to look up and analyze the instruction set applied for the AI model, and perform an instruction transforming procedure to the instructions included in the instruction set for generating a transformed instruction set (step S18). In one embodiment, the weighted CPU 4 is an Intel architecture-based CPU, and the instruction set applied for the weighted CPU 4 is an Intel architecture-based instruction set, but not limited thereto.

As mentioned above, current technologies do not effectively schedule and distribute the procedures being executed by the CPU while performing the AI related computations. In other words, the CPU executes each of the received instructions according to the receiving order of the instructions, and the CPU does not optimize the distribution for the plurality of threads in the CPU in order to balance the loading of each of the threads.

In this disclosure, the instruction transforming procedure is executed to modify the instruction set applied for the AI model. Through the modified instruction set, the AI model may determine and set a weighting value of each of a plurality of procedures being executed for distributing and scheduling these procedures before sending instructions to the weighted CPU 4. As a result, when the weighted CPU 4 receives instructions from the AI model, the weighted CPU 4 may averagely distribute the procedures being executed to each of multiple threads 5 of the weighted CPU 4 according to the weighting values of the procedures. Therefore, the finite resources of the weighted CPU 4 may be effectively used, and the execution speed of the procedures may be increased.

After the step S18, the AI model issues instructions to the weighted CPU 4 according to the transformed instruction set (step S20). The weighted CPU 4 receives the instructions from the AI model, and averagely distributes multiple procedures indicated by the AI model to multiple threads 5 of the weighted CPU 4 for executing respectively according to the weighting value of each procedure indicated by the AI model (step S22). In this embodiment, each of the multiple procedures may include computations performed to the one or multiple consolidate matrixes 32 generated from the matrix simplifying procedure 3, but not limited thereto.

It should be noted that, when computations are performed, the AI model may call library for running the instruction set of the CPU. This invention modifies instructions of the instruction set (such as an Intel architecture based instruction set), so the AI model may determine and set the weighting values of multiple procedures before issuing instructions to the weighted CPU 4, and the weighted CPU 4 may averagely distribute the multiple procedures to multiple threads 5 of the weighted CPU 4 according to the weighting values.

The detailed description of calling library is omitted here for brevity.

Figure 4:
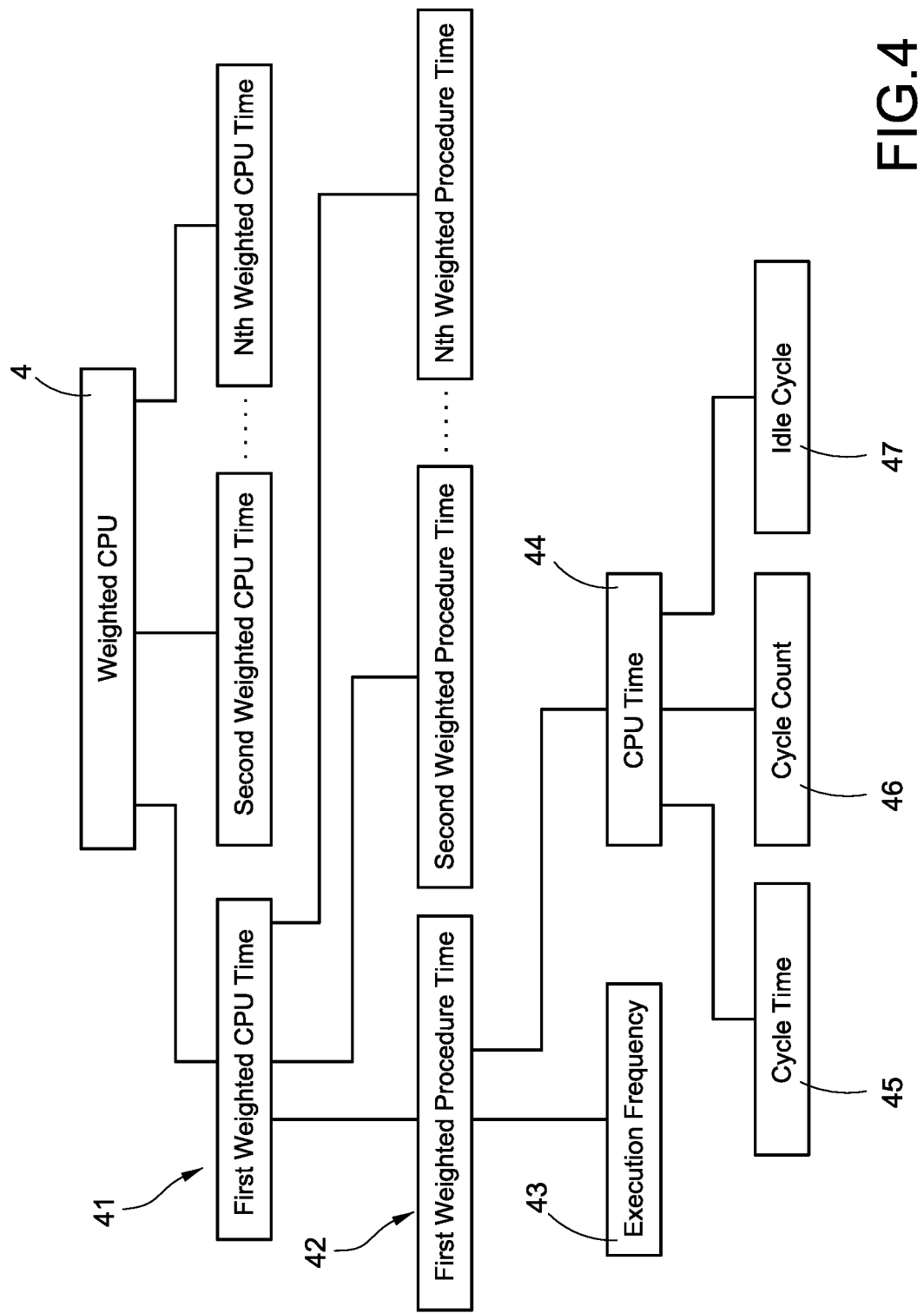
FIG. 4 is a schematic diagram of a weighted CPU of a first embodiment according to this invention.

FIG. 4 is a schematic diagram of a weighted CPU of a first embodiment according to this invention. As disclosed in FIG. 4, when a weighted CPU 4 is operating, the weighted CPU 4 includes multiple sections of weighted CPU time 41 based on its execution cycle. A first weighted CPU time to an Nth weighted CPU time are exampled in FIG. 4. The weighted CPU 4 may control multiple threads 5 (a first thread to an Nth thread as exampled in FIG. 4) to operate simultaneously during each weighted CPU time 41, and each weighted CPU time 41 is equal to a sum of the weighted procedure time 42 of all of the multiple threads 5. In particular, the weighted procedure time 42 indicates the time of single thread 5 executing single procedure.

More specific, the weighted procedure time 42 is equal to a product of a program frequency and a CPU time 44 being occupied during this thread 5 executes the distributed procedure, and the CPU time 44 is equal to a product of a cycle time 45 of this thread 5 and a sum of a cycle count 46 of this thread 5 and an idle cycle of this thread 5.

It can be understood from the above description that the weighted CPU 4 may simultaneously execute multiple procedures through the multiple threads 5 during each weighted CPU time 41, hence, if the procedure being executed by each thread 5 in each weighted procedure time 42 is effectively distributed, the resource using rate of the entire weighted CPU 4 may be greatly improved.

Please refer back to FIG. 2. After the step S22, the executing method of this disclosure (i.e., the driver or the middleware incorporated with the executing method) determines whether the program codes are executed completely (step S24), and re-executes the step S12 to the step S22 before the program codes are executed completely. Therefore, the electronic device may use the executing method of this disclosure to implement AI related processes (such as the inference process 2) by using the weighted CPU 4.

The executing method of this disclosure combines the matrix simplification technology and the thread distribution technology of the weighted CPU, which reduces the amount of the computation parameters being processed in the AI related computations, and optimizes the procedure managements for the multiple threads of the weighted CPU, so as to achieve the purpose of using the low-end hardware to develop and practice AI. In comparison with related art, the executing method of this disclosure effectively reduces the cost and limitation in AI development and enhances practical use of AI.

As the skilled person will appreciate, various changes and modifications can be made to the described embodiment. It is intended to include all such variations, modifications and equivalents which fall within the scope of this invention, as defined in the accompanying claims.

What is claimed is:

1. A method for a central processing unit (CPU) to execute artificial intelligence (AI) related processes, incorporated with an electronic device at least comprising a weighted CPU, and the method comprising:
 a) executing TensorFlow on the electronic device;
 b) calling at least one AI model of TensorFlow according to content of program codes;
 c) determining and obtaining one or multiple sparse matrixes used by the AI model in performing a computation;
 d) executing a matrix simplifying procedure to the one or multiple sparse matrixes;
 e) executing an instruction transforming procedure to an instruction set applied for the AI model and generating a transformed instruction set;
 f) issuing an instruction to the weighted CPU according to the transformed instruction set by the AI model; and
 g) distributing multiple procedures to multiple threads of the weighted CPU for executing respectively according to a weighting value of each of the multiple procedures indicated by the AI model after the weighted CPU receiving the instruction.

2. The method in claim 1, wherein the step a) comprises executing TensorFlow according to a command of import TensorFlow in program codes.

3. The method in claim 1, wherein the AI model at least comprises an imageNet model and an inception model.

4. The method in claim 1, wherein the matrix simplifying procedure comprises decomposing the one or multiple sparse matrixes into one or multiple consolidate matrixes, wherein the multiple procedures at least comprise computing the one or multiple consolidate matrixes.

5. The method in claim 1, wherein the weighted CPU comprises an Intel architecture-based CPU, and the instruction set applied for the AI model comprises an Intel architecture-based instruction set.

6. The method in claim 1, wherein a weighted CPU time of the weighted CPU is equal to a sum of a weighted procedure time of each of the multiple threads, the weighted procedure time of each of the multiple threads is equal to a product of a CPU time and a program frequency of executing a corresponding procedure of the procedures, and the CPU time is equal to a product of a cycle time and a sum of a cycle count and an idle cycle, wherein each of the threads comprises the cycle time, the cycle count and the idle cycle.

* * * * *